United States Patent [19]
Yamada et al.

[11] Patent Number: 4,710,695
[45] Date of Patent: Dec. 1, 1987

[54] POWER SUPPLY CIRCUIT

[75] Inventors: Satoshi Yamada; Kaoru Furukawa, both of Hikone, Japan

[73] Assignee: Matsushita Electric Works, Ltd., Osaka, Japan

[21] Appl. No.: 914,040

[22] Filed: Oct. 1, 1986

[30] Foreign Application Priority Data

Oct. 14, 1985 [JP] Japan .................................. 60-228147

[51] Int. Cl.[4] ........................ H02J 7/10; H02M 3/335
[52] U.S. Cl. ...................................... 320/21; 320/32; 363/18; 363/21
[58] Field of Search ............... 320/20, 21, 32; 363/18, 363/19, 21, 97

[56] References Cited

U.S. PATENT DOCUMENTS

| | | | |
|---|---|---|---|
| 4,333,139 | 6/1982 | Owen et al. | 363/18 X |
| 4,376,263 | 3/1983 | Pittroff et al. | 320/32 |
| 4,394,719 | 7/1983 | Moberg | 363/18 |
| 4,464,619 | 8/1984 | Schwarz et al. | 320/40 |
| 4,523,139 | 6/1985 | Schwarz et al. | 363/21 X |
| 4,652,984 | 3/1987 | van der Akker et al. | 363/18 |

Primary Examiner—R. J. Hickey
Attorney, Agent, or Firm—Armstrong, Nikaido, Marmelstein & Kubovcik

[57] ABSTRACT

A transformer employed in a power supply circuit of a ringing choke converter type comprises two feedback windings which share the current to be supplied to the base of a switching transistor for blocking oscillation. By virtue of the provision of the two feedback windings, a speedup capacitor for delivering a trigger current to the switching transistor is allowed to have less capacity, while the amount of heat generation of a resistor for regulating the trigger current can be restrained. These advantageous features of the present invention produces the effect that the bulk and weight of the capacitor and the resistor can be reduced, which leads to curtailing of the cost of the components as well as enhancing of the reliability of the circuit. The effect is more appreciable when a higher output is required.

10 Claims, 11 Drawing Figures

POWER SUPPLY CIRCUIT

BACKGROUND OF THE INVENTION

1. Field of the Invention

The present invention relates to a power supply circuit which produces a dc output through a process of DC-DC conversion, and more particularly to such a power supply circuit of a ringing choke converter type adapted in use to charge a battery.

2. Description of the Prior Art

It is generally recognized that a DC-DC conversion system is suitable for obtaining a desired dc power output from a dc voltage power source, and useful in providing a power supply circuit for charging a battery. In this accord, there has been a DC-DC converter generally referred to as a ringing choke converter (RCC) as disclosed in U.S. Pat. No. 4,376,263. This type of DC-DC converter produces an output as a form of a released energy from an output winding of a transformer by blocking oscillation. In the circuit, a feedback current is fed to the base of a switching transistor for controlling the ringing choke converter in a positive feedback manner. However, since the feedback current is made from the entire output winding of the transformer, the total induction voltage of the output winding is to be applied across a resistor and capacitor combination inserted in series between the output winding and the base of the switching transistor. This means the resistor and the capacitor are to have great heat and voltage endurances respectively.

To this end, there has been proposed a scheme to provide a feedback winding other than the output winding. The scheme is exemplarily shown in the circuit diagram of FIG. 8 for easy understanding thereof. The circuit operating from a dc power source S to charge a battery B comprises a switching transistor 101, and a transformer 110 having an input winding 111, an output winding 112, and a feedback winding 113. The circuit further comprises a starting resistor 121, a current regulating resistor 123, and a speedup capacitor 132.

The provision of the feedback winding 113 produces the effect that the feedback current fed to the base of the switching transistor 101 is reduced to such an extent as to allow the use of smaller electric components as the resistor 123 and the capacitor 132 acceptable for a compact circuit designing purpose. With this circuit, it may be possible to produce a larger charge current by increasing the feedback current, i.e., the base current of the switching transistor. However, this eventually leads to the increase in bulk and weight of the electric components and therefore has a certain limitation as to the output obtained from the standpoint of designing a compact and cost effective circuit arrangement. In this respect, the circuit is not satisfactory to produce a greater output at a minimum bulk and weight requirement to the electric components.

SUMMARY OF THE INVENTION

For elimination of the above problems the present invention contemplates to provide an improved power circuit of a ringing choke converter type. The circuit is adapted in use to charge a battery from a dc power source and includes a transformer with its input winding connected to the dc voltage power source and its output winding connected to the battery to be charged. The transformer further includes feedback winding means which is cooperative with a switching transistor, a current regulating resistor, a speedup capacitor, and the input winding to form a blocking oscillator. The blocking oscillator operates in a positive feedback manner to interrupt at a predetermined frequency the current supplied to the input winding in order to induce a voltage across the output winding. The induced voltage is rectified and smoothed to be applied to the battery for charging the same.

The characterizing feature of the present invention resides in that the feedback winding means of the transformer is composed of a pair of first and second feedback windings. The second feedback winding is inserted in the base-emitter path of the switching transistor in parallel relation with a series circuit of the first feedback winding and the speedup capacitor. In the thus-constructed circuit, each of the first and the second feedback windings share a part of the total feedback current to be supplied to the base of the switching transistor. In detail, the voltage induced in the first feedback winding supplies a trigger current for the switching transistor, while the voltage induced in the second feedback winding supplies the subsequent base current for maintaining the switching transistor conductive. This enables the circuit to produce a larger output or charge current while retaining the current regulating resistor and the speedup capacitor to be of less bulk and weight, giving rise to a compact and cost effective circuit arrangement yet having higher output capability.

Accordingly, it is a primary object of the present invention to provide a power supply circuit of a ringing choke converter type which is capable of effectively producing a higher output at a minimum requirement to the size and cost of the electric components.

In the preferred embodiments, the timing of adding the currents from the first and second feedback windings can be controlled in such a manner as to effectively produce the added current to the base of the switching transistor. A control transistor is inserted between the second feedback winding and the base of the switching transistor with its base-emitter circuit comprising the speedup capacitor connected in series with the first feedback winding in order to be biased to flow the current from the second feedback winding when a voltage developed across the speedup capacitor is increased to a threshold level determined by the capacitor alone. Consequently, by suitably selecting the capacitance of the speedup capacitor the timing of adding the current from the second feedback winding to that from the first feedback winding can be easily adjusted for producing the added base current at a minimum level enough for biasing the switching transistor. This means that the switching transistor can be controlled at a minimum base current and therefore at a minimum power loss. In addition, this structure allows the use of single base current regulating resistor.

It is therefore another object of the present invention to provide a power supply circuit of a ringing choke converter type which is capable of effectively operating at a minimum power loss.

In the preferred embodiments, there are provided a shunting transistor which is connected in the base-emitter path of the switching transistor with its base and emitter connected across a current sensing resistor inserted between the emitter of the switching transistor and the negative side of the dc power source. The shunting transistor is introduced to shunt the base-emitter path of the switching transistor for turning off the switching transistor when the voltage across the current sensing resistor corresponding to the current flowing through the switching transistor is increased to a prescribed level. In this way, the switching transistor is compulsorily turned off before the transistor reaches the saturation point with regard to the collector current thereof so as to regulate the switching cycle of the switching transistor and consequently the charging time of the battery.

In a preferred embodiment, there is disclosed an advantageous scheme to connect one end of the second feedback winding of the transformer to the junction between the emitter of the switching transistor and the current sensing resistor. Thus, by better utilization of the current sensing resistor, the voltage developed across the current sensing resistor is effectively added to the voltage induced in the second feedback winding in producing the current to be added to the current from the first feedback winding, enabling the reduction in the number of turns required or the size thereof while successfully supplying sufficient current, which is therefore a further object of the present invention.

The above and other objects of the present invention will be more apparent in the following detailed description of the preferred embodiments when taken in conjunction with the attached drawings.

DETAILED DESCRIPTION OF THE PREFERRED EMBODIMENTS

Figure 1:
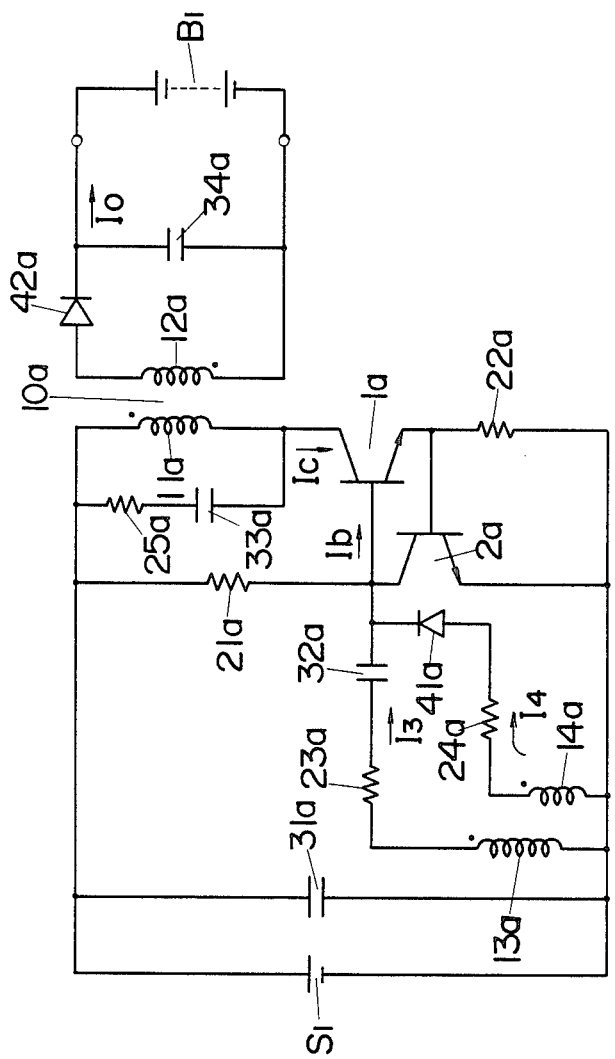
FIG. 1 a circuit diagram of a power supply circuit in accordance with a first embodiment of the present invention.

Referring now to FIG. 1, there is shown a power supply circuit in accordance with a first embodiment of the present invention. The circuit is adapted in use to charge a battery B1 from a dc power source S1 and is in the form of a ringing choke converter (RCC). The RCC circuit comprises a blocking oscillator operating from the dc power source S1 which may be obtained through rectification and smoothing of an ac power source. The blocking oscillator includes a switching transistor $1a$ and a transformer $10a$ with an input winding $11a$, an output winding $12a$, a first feedback winding $13a$, and a second feedback winding $14a$, the input winding $11a$ being connected to the dc power source S1 and the output winding $12a$ to the battery B1 to be charged. The blocking oscillator further includes a capacitor $31a$ and a series circuit of the input winding $11a$, the switching transistor $1a$ and a current sensing resistor $22a$. Also included in the blocking oscillator are a series circuit of the first feedback winding $13a$, a first current regulating resistor $23a$ and a speedup capacitor $32a$, and a series circuit of the second feedback winding $14a$, a second current regulating resistor $24a$ and a diode $41a$, wherein the two series circuits are connected in parallel relation between the emitter and the base of the switching transistor $1a$.

Figure 2:
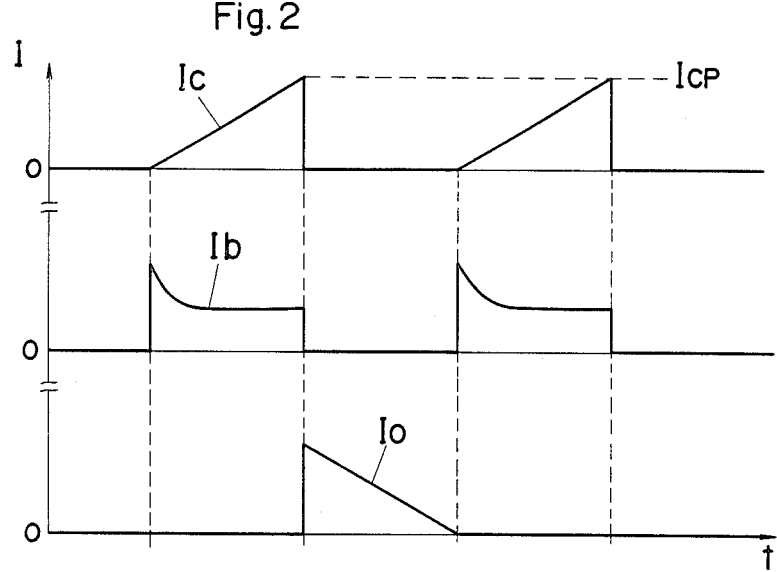
FIG. 2 shows a timing diagram of several current waveforms formed the circuit of FIG. 1.

The blocking oscillator starts with the initiation of a current flow to the base of the switching transistor $1a$ via a starting resistor $21a$ from the dc power source S1. Upon this occurrence, the collector-emitter path of the switching transistor $1a$ is made conductive due to a voltage development at the base of the switching transistor $1a$ to cause the flow of a collector current Ic as shown in FIG. 2 through the input winding $11a$ of the transformer $10a$. The collector current Ic flowing through the input winding $11a$ induces voltages in the feedback windings $13a$ and $14a$ to form a subsequent base current Ib as shown in FIG. 2 to be supplied to the base of the switching transistor $1a$ for turning on the switching transistor $1a$ instead. Since the feedback windings are so wound as to provide a positive feedback to the switching transistor $1a$, the circuit oscillates as a natural consequence.

Figure 3A:
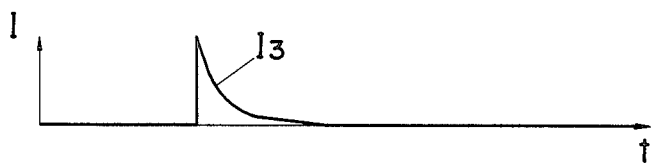
FIGS. 3A, 3B, 3C and 3D show other current waveforms formed in the circuit of FIG. 1.
Figure 3B:
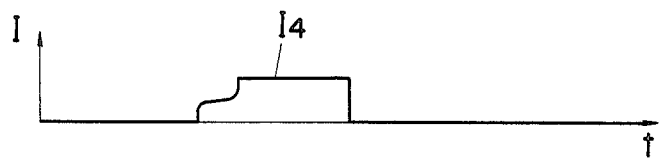
Figure 3C:
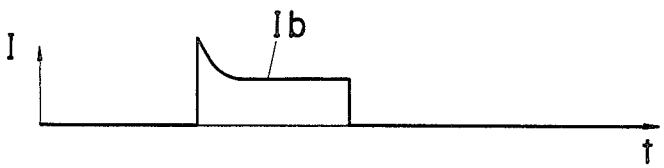
Figure 3D:
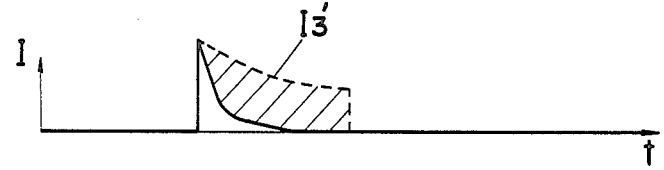

The total base current Ib (FIG. 3C) of the switching transistor $1a$ is composed of a current $I_3$ (FIG. 3A) supplied from the first feedback winding $13a$ and a current $I_4$ (FIG. 3B) supplied from the second feedback winding $14a$. Comparing the waveform of the current $I_3$ of the present invention with that of the corresponding base current $I_3'$ of the conventional circuit as in FIG. 3D, it is very clear that the integration amount of the current $I_3$ is much smaller than that of the current $I_3'$, wherein the current corresponding to the dashed area in FIG. 3D is supplied from the second feedback winding $14a$ in this embodiment. For this reason, the speedup capacitor $32a$ and the first current regulating resistor $23a$ through which the current $I_3$ flows are permitted to have less capacity and reduced amount of heat generation respectively.

The intermittent current flowing through the input winding $11a$ induces a voltage in the output winding $12a$, which induced voltage is subjected to a half-wave rectification by a diode $42a$ and then to a smoothing process by a capacitor $34a$ to produce a dc voltage. The converted dc voltage forms a charge current Io as shown in FIG. 2 for charging the battery B1 in the blocking phase of the blocking oscillation.

A shunting transistor $2a$ is provided between the base and the emitter of the switching transistor $1a$ for the purpose of inhibiting the switching transistor $1a$ every time the collector current of the switching transistor $1a$ is increased to a prescribed value Icp as shown in FIG. 2 preceding the saturation point thereof. The inhibition action by the shunting transistor $2a$ consequently regulates the switching cycle of the switching transistor $1a$ which depends on the inherent current gain of the switching transistor employed. By virtue of the switching cycle regulation of the switching transistor $1a$, the time required for charging the battery can be made constant.

It should be noted here that the second current regulating resistor $24a$ is provided for regulating the current from the second feedback winding $14a$, while the diode $41a$ is provided for preventing the counterflow of the current supplied from the first feedback winding $13a$ or the starting resistor 21a to the base of the switching transistor 1a. On the other hand, a series circuit consisting of a capacitor 33a and a resistor 25a is connected in parallel with the input winding 11a of the transformer 10a to absorb possible surge currents therein.

The number of turns of the first feedback winding 13a is preferably greater than that of the second feedback winding 14a to induce higher voltage in the winding 13a. This is intended for utilizing the higher voltage induced in the first feedback winding 13a for supplying the switching transistor 1a with a larger current enough to trigger the transistor 1a by way of the speedup capacitor 32a, as well as utilizing the lower voltage induced in the second feedback winding 14a for supplying the transistor 1a with a base current only to maintain it conductive. It is acceptable that the number of turns of the second feedback winding 14a is as same as or more than that of the first feedback winding 13a.

In the thus-constructed circuit, the speedup capacitor 32a is permitted to have a reduced capacity when the switching transistor 1a can be triggered by a pulse current of extremely short duration. The second current regulation resistor 24a is also permitted to have smaller resistance when the voltage developed across the second feedback winding 14a can be reduced so far as the switching transistor 1a is kept conductive.

Figure 4:
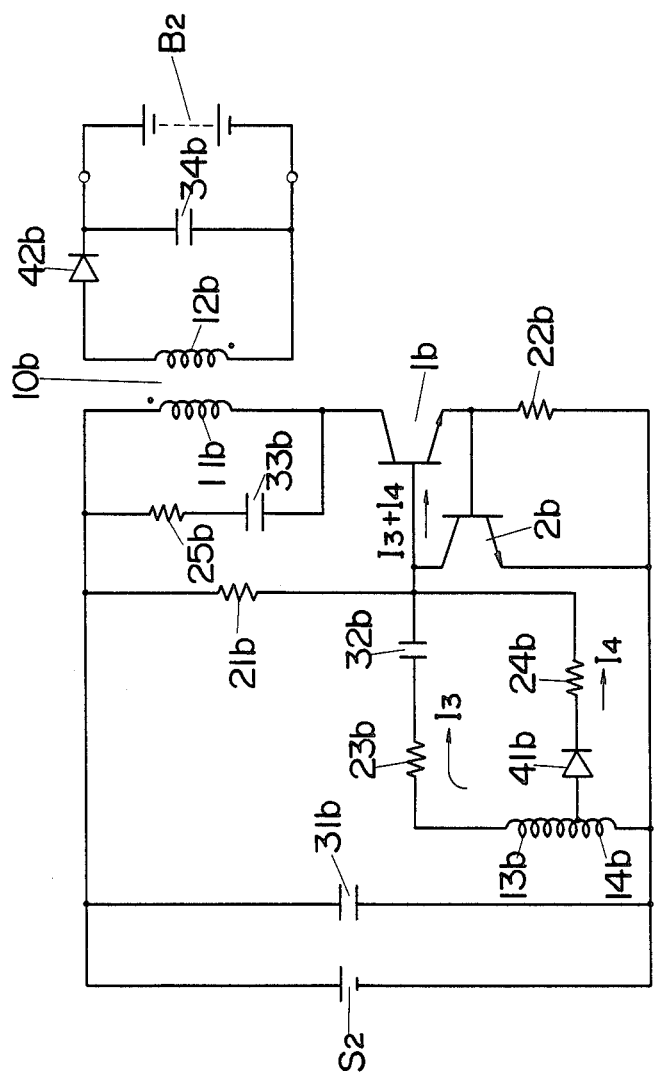
FIG. 4 shows a circuit diagram of a power supply circuit in accordance with a second embodiment of the present invention.

FIG. 4 shows a second embodiment of the present invention. The present embodiment which operates from a dc power source S2 comprises a capacitor 31b, a switching transistor 1b, a shunting transistor 2b and a transformer 10b having an input winding 11b, an output winding 12b, and first and second feedback windings 13b and 14b. The feedback windings 13b and 14b of this embodiment are provided connectedly in the transformer 10b with a tap provided at the junction of the two feedback windings. The present embodiment further comprises a starting resistor 21b, a current sensing resistor 22b, a first current regulating resistor 23b, a speedup capacitor 32b, a diode 41b, a second current regulating resistor 24b, a resistor 25b and a capacitor 33b. On the side of the output winding 12b, there are comprised a diode 42b and a capacitor 34b to charge a battery B2. The present embodiment has substantially the same configuration and operation as those of the first embodiment.

Figure 5:
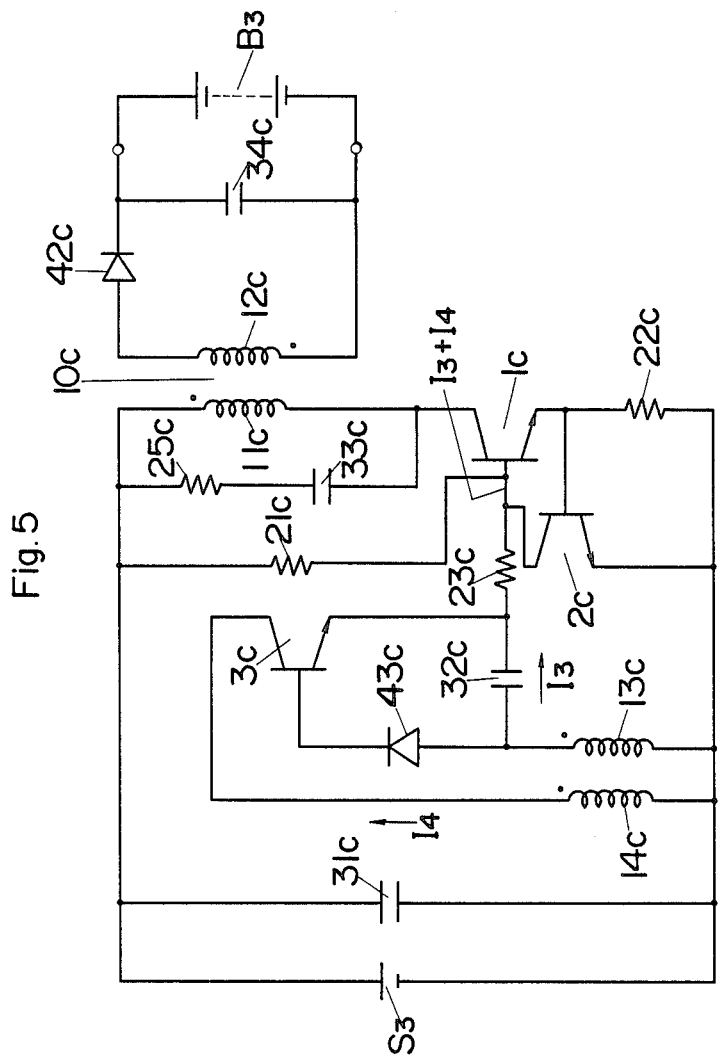
FIG. 5 shows a circuit diagram of a power supply circuit in accordance with a third embodiment of the present invention.

FIG. 5 shows a third embodiment of the present invention. The present embodiment which operates from a dc power source S3 comprises a capacitor 31c, a switching transistor 1c, a shunting transistor 2c and a transformer 10c having an input winding 11c, an output winding 12c, and first and second feedback windings 13c and 14c. The feedback windings 13c and 14c of this embodiment are provided separately in the transformer 10c. The present embodiment further comprises a starting resistor 21c, a current sensing resistor 22c, a current regulating resistor 23c, a speedup capacitor 32c, a diode 43c, a control transistor 3c, a resistor 25c and a capacrtor 33c. On the side of the output winding 12c, there are comprised a diode 42c and a capacitor 34c to charge a battery B3.

This embodiment has the characterizing feature as follows. A series circuit consisting of the second feedback winding 14c and the control transistor 3c is connected in parallel relation with a series circuit consisting of the first feedback winding 13c and the speedup capacitor 32c. The emitter of the control transistor 3c is connected to the junction between the speedup capacitor 32c and the current regulating resistor 23c, while the base of the control transistor 3c is connected via the diode 43c to the junction between the speedup capacitor 32c and the first feedback winding 13c.

Referring now to the operation of this embodiment, during the initial stage of supplying a feedback base current to the switching transistor 1c from the first feedback winding 13c via the speedup capacitor 32c and the current regulating resistor 23c, the second feedback winding 14c is kept disconnected from the switching transistor 1c so that it will not add any extra current to the current from the first feedback winding 13c in view of the fact that the current from the first feedback winding 13c is enough for triggering the switching transistor 1c. The second feedback winding 14c is rendered connected to the base of the switching transistor 1c by the operation of the control transistor 3c after the switching transistor 1c is triggered so as to add the current from its own to the current from the first feedback winding 13c for maintaining the switching transistor 1c to be on for a required time period.

More in detail, when feedback voltages are induced in the first and the second feedback windings 13c and 14c, firstly a current begins to flow from the first feedback winding 13c via the series circuit consisting of the speedup capacitor 32c and the current regulating resistor 23c to the base of the switching transistor 1c. The control transistor 3c is not conductive until the voltage developing across the speedup capacitor 32c is increased to a prescribed level as a result of sufficient current being supplied thereto after triggering the switching transistor 1c. Consequently, by selecting the capacitance of the speedup capacitor 32c the timing of biasing the control transistor 3c or the timing of adding the current from the second feedback winding 14c to that from the first feedback winding 13c can be readily adjusted in order to provide an effective integration of the currents for driving the circuit at a minimum power loss.

In the present embodiment, the control transistor 3c is made conductive when the voltage across the speedup capacitor 32c reaches 1.4 V, which approximately corresponds to the double of the forward voltage inherent to a diode. A mere substitution of a zener diode having a desired characteristic for the diode 43c can determine the bias voltage across the speedup capacitor 32c at which the control transistor 3c is made conductive. The conduction of the control transistor 3c consequently causes a current flow from the second feedback winding 14c which is added to the current from the first feedback winding 13c to form the base current of the switching transistor 1c.

Figure 6:
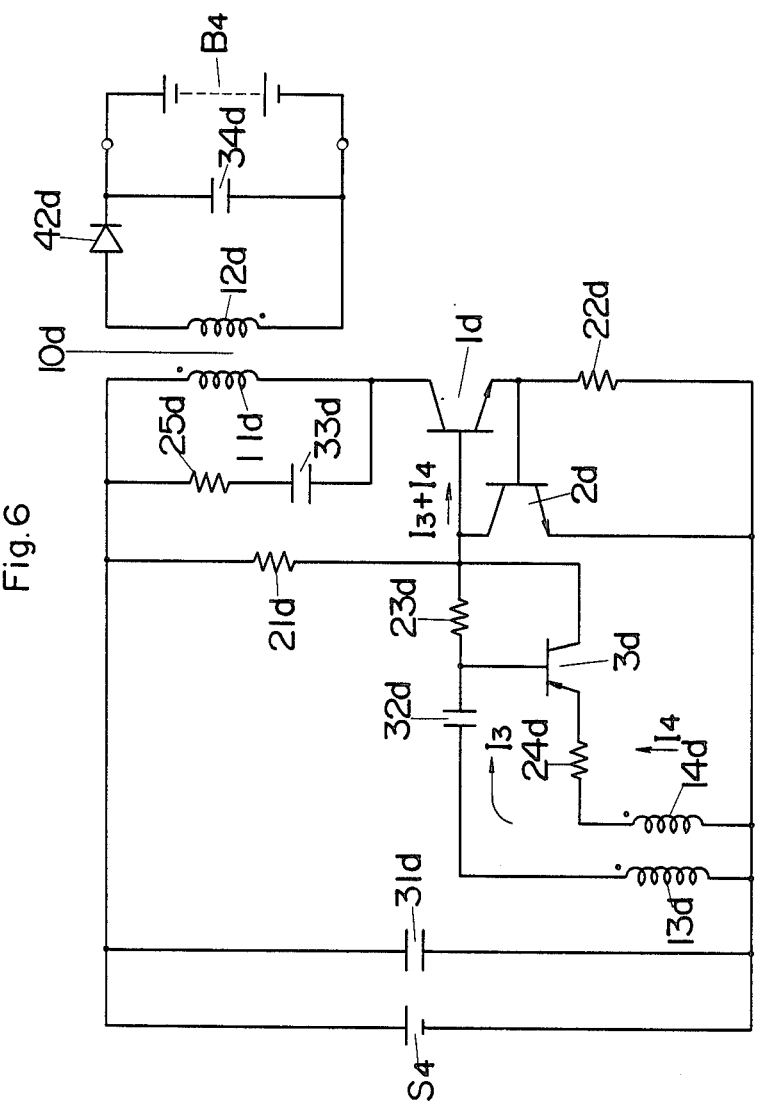
FIG. 6 shows a circuit diagram of a power supply circuit in accordance with a fourth embodiment of the present invention.

FIG. 6 shows a fourth embodiment of the present invention. The present embodiment which operates from a dc power source S4 comprises a capacitor 31d, a switching transistor 1d, a shunting transistor 2d and a transformer 10d having an input winding 11d, an output winding 12d, and first and second feedback windings 13d and 14d. The feedback windings 13d and 14d of this embodiment are provided separately in the transformer 10d. The present embodiment further comprises a starting resistor 21d, a current sensing resistor 22d, a first current regulating resistor 23d, a speedup capacitor 32d, a second base current regulating resistor 24d, a control transistor 3d, a resistor 25d and a capacitor 33d. On the side of the output winding 12d, there are comprised a diode 42d and a capacitor 34d to charge a battery B4. This embodiment is characterized in that a series circuit consisting of the second feedback winding 14d, the second current regulating resistor 24d and the control transistor 3d is connected in parallel relation with a series circuit consisting of the first feedback winding 13d, the speedup capacitor 32d and the first current regulating resistor 23d, wherein the base of the control transistor 3d is connected to the junction between the speedup capacitor 32d and the first current regulating resistor 23d.

Referring to the operation of the fourth embodiment, the control transistor 3d is not conductive when the voltage at the base thereof with respect to the emitter is higher than a prescribed level in order to prevent the current induced in the feedback winding 14d from being supplied to the base of the switching transistor 1d. When the voltage at the base of the control transistor 3d with respect to the emitter thereof becomes lower than the prescribed level, the current induced in the second feedback winding 14d begins to be supplied to the base of the switching transistor 1d. This embodiment carries out substantially the same operation as the third embodiment.

Figure 7:
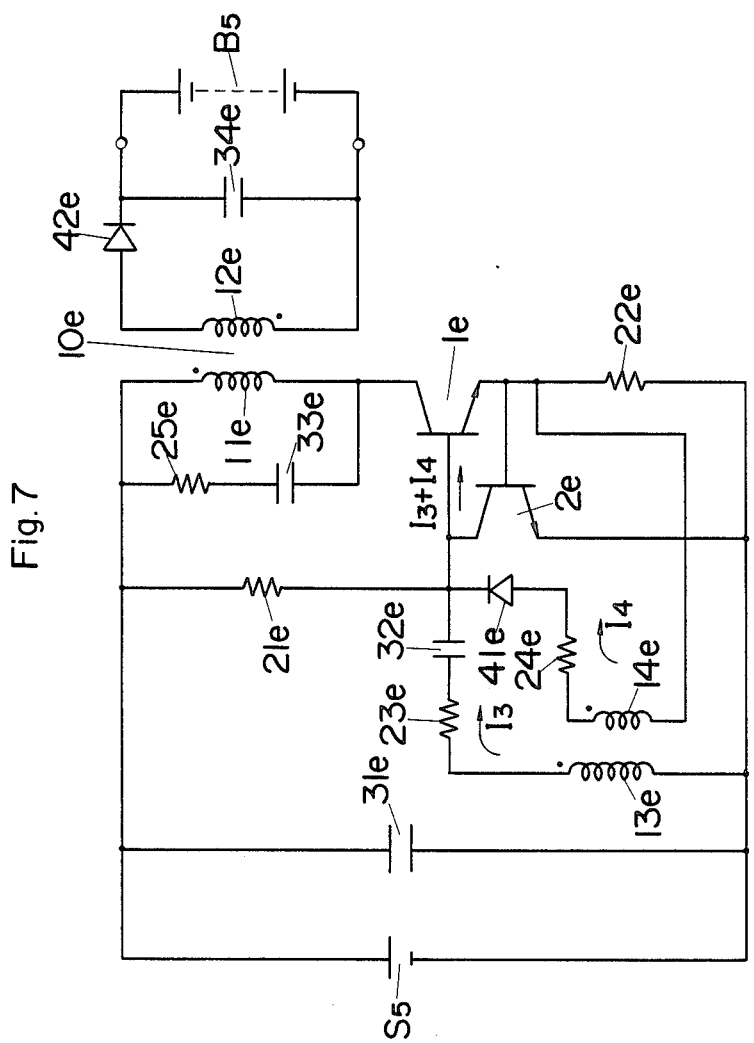
FIG. 7 shows a circuit diagram of a power supply circuit in accordance with a fifth embodiment of the present invention.
Figure 8:
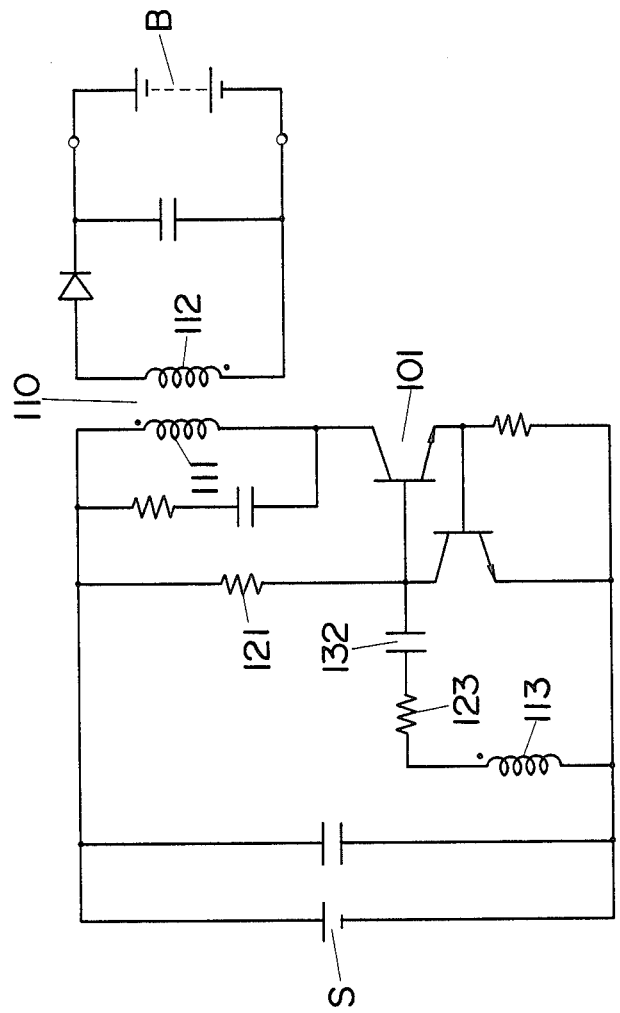
FIG. 8 shows a circuit diagram illustrating a prior art power supply circuit.

FIG. 7 shows a fifth embodiment of the present invention. The present embodiment which operates from a dc power source S5 comprises a capacitor 31e, a switching transistor 1e, a shunting transistor 2e and a transformer 10e having an input winding 11e, an output winding 12e, and first and second feedback windings 13e and 14e. The feedback windings 13e and 14e of this embodiment are provided separately in the transformer 10e. The present embodiment further comprises a starting resistor 21e, a current sensing resistor 22e, a first current regulating resistor 23e, a speedup capacitor 32e, a second current regulating resistor 24e, a diode 41e, a resistor 25e and a capacitor 33e. On the side of the output winding 12e, there are comprised a diode 42e and a capacitor 34e to charge a battery B5. This embodiment is characterized in that the current sensing resistor 22e is inserted between the negative side of the dc power source S5 and the second feedback winding 14e, which means one end of the second feedback winding 14e is connected to the junction between the base of the switching transistor 1e and the current sensing resistor 22e.

Referring to the operation of the fifth embodiment, the above-mentioned connection manner of the feedback winding 14e to the junction between the emitter of the switching transistor 1e and the current sensing resistor 22e produces the effect that the voltage developed across the current sensing resistor 22e is added to that developed across the second feedback winding 14e, permitting the second feedback winding 14e to require less number of turns or less size thereof while producing the added current of sufficient level to the switching transistor 1e.

What is claimed is:

1. A power supply circuit of ringing choke converter type adapted in use to charge a battery from a dc power source comprising:
   a transformer having its primary winding connected to the dc power source and having its secondary winding connected to the battery to be charged;
   a switching transistor connected in series with the primary winding
   a series combination of a resistor and a speedup capacitor connected in the base-emitter path of the switching transistor to be cooperative with the switching transistor and the transformer to form a blocking oscillator in which the switching transistor is controlled to alternately turn on and off to interrupt the current to the primary winding and thereby develop an induced voltage across the secondary winding;
   first and second feedback windings provided in the transformer and connected in the base-emitter path of the switching transistor;
   said first feedback winding being connected to the series combination of the resistor and the speedup capacitor so as to provide a first current to the base of the switching transistor to trigger it on; and
   said second feedback winding being connected in a parallel relation with the combination of the first feedback winding and the speedup capacitor so as to provide a second current which is added to said first current to be applied to the base of the switching transistor to maintain the switching transistor conductive.

2. A power supply circuit as set forth in claim 1, wherein the first and the second feedback windings are provided separately in the transformer.

3. A power supply circuit as set forth in claim 1, wherein the first and the second feedback windings are provided connectedly in the transformer with a tap being provided at the junction between the two feedback windings.

4. A power supply circuit as set forth in claim 1, further comprising control means for determining the timing of adding the second current from the second feedback winding to the first current from the first feedback winding, said control means permitting the addition of the second current to the first current when the speedup capacitor is charged up to a prescribed threshold level.

5. A power supply circuit as set forth in claim 4 wherein said control means comprising an n-p-n transistor connected in series with the second feedback winding with its base and emitter connected across the speedup capacitor.

6. A power supply circuit as set forth in claim 4 wherein said control means comprising a p-n-p transistor connected in series with the second feedback winding with its base and emitter connected across a series circuit consisting of the speedup capacitor, the first feedback winding and the second feedback winding.

7. A power supply circuit as set forth in claim 1, further comprising a shunting transistor connected in the base-emitter path of the switching transistor, and comprising a current sensing resistor connected between the emitter and the negative side of the dc power source, said shunting transistor having its base connected to the junction between the current sensing resistor and the emitter of the switching transistor so that it shunts the base-emitter path of the switching transistor to inhibit the blocking oscillation when the voltage across the current sensing resistor is increased to a prescribed reference level.

8. A power supply circuit as set forth in claim 7, wherein said second feedback winding is connected to the negative side of the dc power source by way of said current sensing resistor.

9. A power supply circuit as set forth in claim 1, wherein a diode is inserted between the second feedback winding and the base of the switching transistor with its cathode connected to the base of the switching transistor.

10. A power supply circuit as set forth in claim 1, wherein the number of turns of the first feedback winding is greater than that of the second feedback winding.

* * * * *